C. A. WINN.
ANTIFRICTION BEARING.
APPLICATION FILED FEB. 6, 1919.

1,380,622.

Patented June 7, 1921.

Inventor
Charles A. Winn
By Brown Deutcher & Denver
Attorneys

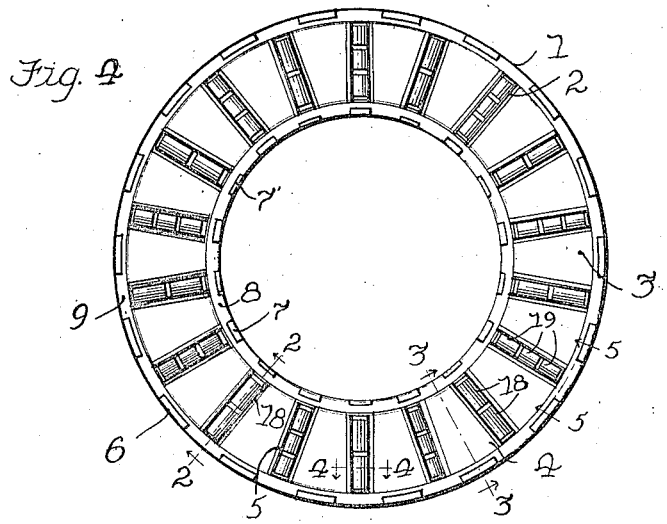
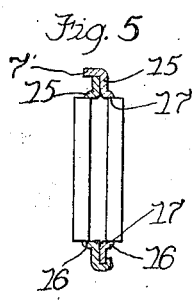
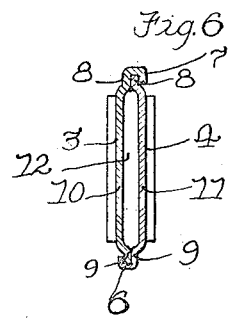
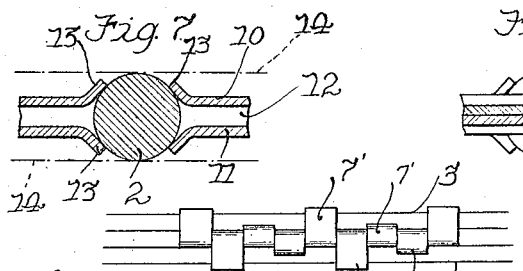
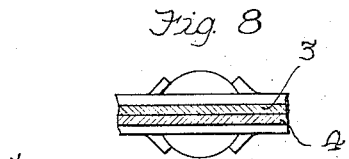
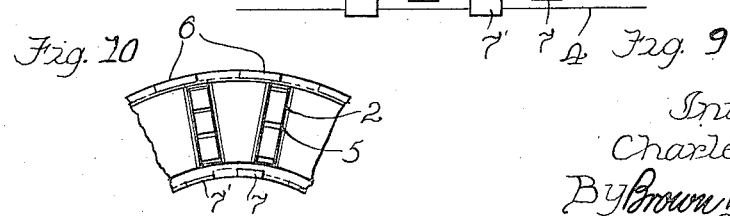

C. A. WINN.
ANTIFRICTION BEARING.
APPLICATION FILED FEB. 6, 1919.

1,380,622.

Patented June 7, 1921.
3 SHEETS—SHEET 3.

Inventor
Charles A. Winn
B. Brown Fortner & Dienner
Attorneys

UNITED STATES PATENT OFFICE.

CHARLES A. WINN, OF CHICAGO, ILLINOIS, ASSIGNOR TO CHICAGO BEARINGS COMPANY, OF CHICAGO, ILLINOIS, A CORPORATION OF ILLINOIS.

ANTIFRICTION-BEARING.

1,380,622.   Specification of Letters Patent.   Patented June 7, 1921.

Application filed February 6, 1919. Serial No. 275,377.

*To all whom it may concern:*

Be it known that I, CHARLES A. WINN, a citizen of the United States, residing at Chicago, in the county of Cook and State of Illinois, have invented a certain new and useful Improvement in Antifriction-Bearings, of which the following is a full, clear, concise, and exact description, reference being had to the accompanying drawings, forming a part of this specification.

My invention relates to improvements in anti-friction bearings and has special reference to anti-friction thrust bearings and associated parts.

In many classes of machinery it has heretofore been impossible to provide roller thrust bearings between associated relatively rotating members or elements on account of the narrow space which it was possible to provide for the bearing and its races and the difficulty of providing adequate backing shoulders for the race rings of the bearings.

It is one of my objects to provide a thrust bearing in the form of a flat ring which shall be capable of being inserted or mounted in a narrow space, which shall effectively eliminate friction between two relatively rotating members, and be practically free of internal friction, and which shall be particularly adapted for association with race ring backing members of limited contacting area. It is a further object of my invention to provide a construction which shall permit the use of roller thrust bearings between two relatively rotating members, one of which is a thin walled sleeve which does not in itself present a sufficient contacting surface for backing up the race of the thrust bearing.

A further object of my invention is to provide a roller thrust bearing of such a character and construction that I am enabled to produce it at a relatively small expenditure of labor and material and investment in special tools.

And it is a further object of my invention to provide a disk-like thrust bearing in which the cage and anti-friction rollers constitute a unitary structure which, though relatively light, shall be rigid against warping out of true normal shape, which shall efficiently distribute the thrust pressure over the surfaces of the associated members with a minimum of internal friction, which shall comprise a hollow sheet metal casing or cage adapted to carry a lubricant and distribute same to the anti-friction elements, and which shall have parts adapted for inter-engagement with associated concentric bearing parts for holding the cage in place.

In order that those versed in the art may clearly understand my invention, attention is directed to said drawings, in which—

Fig. 4 is a plan view of the anti-friction thrust bearing embodying my invention in one, a preferred, form;

Figure 1:
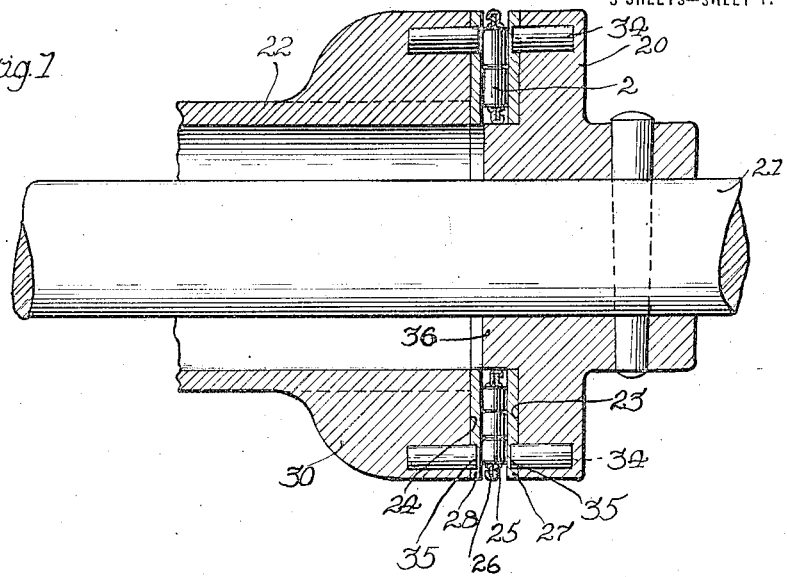
Figure 1 is a longitudinal central section of two relatively rotatable members or collars having one of my improved thrust bearings arranged between them.
Figure 11:
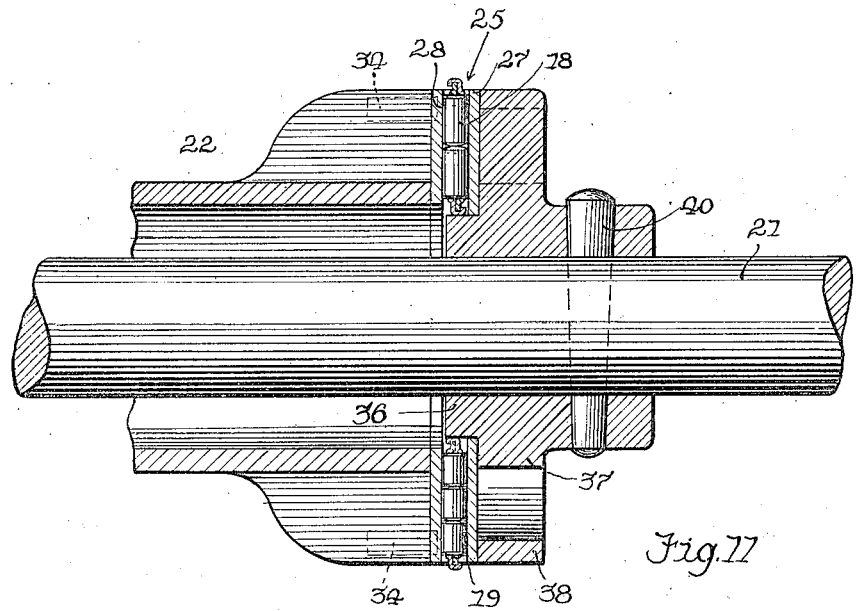
Figure 12:
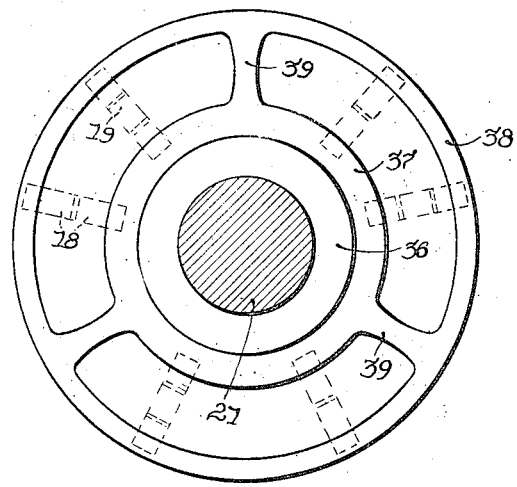

Figs. 5 and 6 are radial sections on the lines 2—2 and 3—3, respectively, of Fig. 4;

Figs. 7 and 8 are enlarged fragmentary sections on the lines 4—4 and 5—5 of Fig. 4;

Fig. 9 is a developed view of the interior edge of the ring;

Fig. 10 is a fragmentary plan view showing a slightly modified form of construction of the cage;

Fig. 11 is a sectional view similar to Fig. 1, illustrating another form of my bearing; and Fig. 12 is a transverse section on the line 12—12 of Fig. 11, the cage, rollers and race ring removed, and several of the sectional rollers shown in position in dotted lines.

The arrangement illustrated in Fig. 1 is typical merely of many applications of my improved bearing and comprises a rotating element 20 in the form of a collar secured to and rotatable with a shaft 21, and an oppositely arranged member 22. The member or element 22 is held concentric with the collar 20 by any suitable means. The members 20 and 22 have opposed flat shoulders 23 and 24 respectively spaced apart longitudinally of the shaft 21 a limited distance as shown and between said flat surfaces within said limited space I insert a roller thrust bearing 25. This bearing is in the form of a thin flat ring 26 carrying radially arranged antifriction rollers 2. I preferably make the collar 20 and the sleeve 22 of material such as cast steel or iron, which it is difficult to provide with hardened race surfaces for the rollers 2 and to provide hardened races for these rollers I provide relatively thin washer-like race members 27 and 28 one for each side of the bearing 25.

In some classes of machinery it is desirable to arrange a thrust bearing between a collar of which the collar 20 is typical, and a sleeve member such as the sleeve 22, which is relatively thin walled as shown but does not present sufficient surface at its end adjacent to the thrust bearing to properly back up the race ring of the bearing. The collar 20 has a flat continuous surface 23 which backs up the race ring 27 and for backing up the race ring 28 I provide the sleeve member 22 with radiating ribs 30 and 31 spaced around the periphery thereof, the ends of the ribs together with the adjacent end of the sleeve presenting a substantially flat surface against which the race ring 28 is positioned and by which it is backed up.

I preferably space the ribs 30 and 31 regularly around the sleeve 20, the ribs 30 presenting flat ends extending to the periphery of the race ring 28 and the intermediate ribs 31 extending part way out to the periphery. This form of backing is advantageous in providing a light weight strong structure and extending the adjacent surface of the sleeve a sufficient distance to properly back up the race ring. Preferably as shown, I provide four of these long ribs 30 and four of the intermediate shorter ribs 31. The race ring 28 lies flat against the adjacent ends of the sleeve 22 formed by the end of the sleeve proper, and the ribs 30 and 31.

As the space allowable for the thrust bearing is so limited the race rings are necessarily relatively thin and even with the eight ribs 30 and 31 the race ring 28 may have a tendency to give way or flax between the ribs when pressure is applied thereto through the anti-friction rollers 2. To prevent such flexing of the race ring, I so circumferentially space the rollers 2 relatively to the ribs that two diametrically disposed rollers are always positioned over two opposite ribs as clearly shown in Fig. 2. In this figure I illustrate the bearing 25 with its rollers in dotted lines and in superposed relation to the sleeve 22. To preserve this relation of the rollers to the ribs as the bearing rotates, I space the rollers around the bearing uniformly, but provide such a number of rollers that while some rollers are intermediate the ribs, others will be over the ribs. As shown I preferably provide an even number of the rollers so that diametrically opposed rollers will simultaneously pass corresponding diametrically opposed ribs and I provide an uneven number of rollers on each half of the bearing to break joints with the ribs and to cause at least one pair of the rollers to be positioned over ribs at all positions of the bearing. In the instance shown I have provided 18 rollers in all, which, being uniformly spaced, provide nine on each half and as there are four ribs on each half of the sleeve, it is apparent that I have provided an arrangement whereby and wherein at least one pair of opposed rollers lie over a pair of opposed backing ribs at all rotative positions of the bearing and these rollers so arranged will prevent the intermediate rollers flexing the thin backing ring 28.

Figure 3:
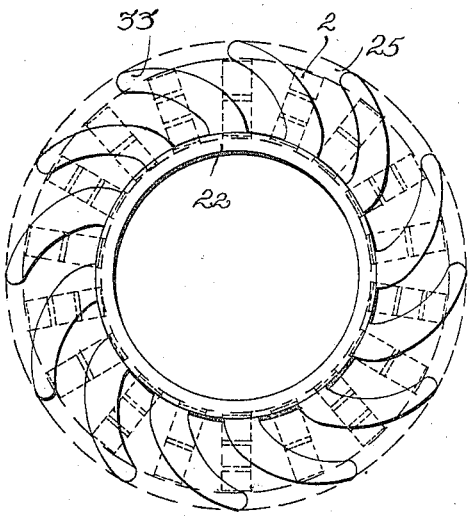
Fig. 3 is a view similar to Fig. 2 showing another form of backing element.

In Fig. 3 I have shown a modified form of backing for the race ring. In this form I curve the ribs 33 instead of making them radial and I am enabled to provide thereby a substantially continuous backing surface for the race ring 28. Although this backing surface may not be continuous radially, I provide a substantially continuous circumferential backing for the ring, as the ribs 33 are all curved around the sleeve in the same direction and their outer ends extend circumferentially over or toward the inner ends of the next adjacent rib. As in the former instance, I preferably provide an even number of these ribs, in the instance shown providing 12, and I provide a number of the rollers 2, which, as before, break joints with the ribs. In the instance shown I provide 18 of the rollers and as shown in Fig. 3 in dotted lines, the rollers occupy many positions relatively to the ribs 33, some opposite pairs being disposed fairly upon the ribs 33 and others adjacent to their ends.

The bearing 25 comprises a metal cage or holder 1 in which I mount the anti-friction rollers 2.

The cage is preferably made in the form of a flat ring with a relatively large open center so as to reduce as much as possible the difference between the outer and inner diameters of the ring.

I build up the cage out of two sheet metal disks 3 and 4 which are substantially identical with each other, as to dimensions, and are formed and adapted to be united into a unitary structure provided with radial slots or openings 5 in which the anti-friction rollers are mounted.

In forming my improved cage I first blank flat disks of proper dimension out of relatively light sheet metal, each disk having a relatively large central opening and in this operation of blanking out I provide the disks with outwardly and inwardly projecting tongues 6 and 7, respectively, with which to later on clamp the disks together.

I then draw or press these flat disks into flattened annular channels, as best shown in Fig. 6, providing them with inner flat flanges 8 and outer similar flat flanges 9, adapted, when the two rings are associated, to form a complete cage, to contact at the outer and inner edges of the ring. The body portion of each ring 3 and 4 is formed outwardly, so that when the rings are placed in contact as shown in Fig. 6, the two body portions 10 and 11 are parallel with each other and are separated to provide an annular space 12 between them. I form the openings 5 for the rollers by first cutting radial slots in the two plates and then forming or bending the radial margins 13 of these slots outwardly, as best shown in Fig. 7 to provide suitable spaces for the rollers between the four formed edges 13. As shown in Fig. 7, the rollers 2 are slightly larger in diameter than the extreme thickness of the cage, as measured over the extended edges of the formed margins 13, and consequently when the ring as a whole is inserted between bearing parts, as indicated by the dotted lines 14 in Fig. 7, the cage will be free in the bearing and the pressure will be taken by the rollers. The slots 5 extend from the inner flanges 8 to the outer flanges 9. I so arrange the tongues or projections 6 and 7 that when the two halves of the rings are assembled, the projections of one ring can be formed over the adjacent edge of the other ring between two adjacent projections thereon, and I thus form all of the projections 7 on the outer edge of the bearing, thus firmly clamping and holding the two parts of the ring together. I also form over each alternate pair of the projections 7 at the inner edge of the ring to interlock and clamp the inner edges of the two halves firmly together. I preferably form each alternate pair 7' of the inner projections 7 at right angles to the disk or extending axially as related to a shaft with which the bearing is associated in use, thus forming an effective circumferential collar or flange for engaging with a concentric bearing part, as described and claimed in my copending application, Serial No. 250,415 filed Aug. 19, 1918.

As shown in Fig. 4, I preferably form the projections 6 at such points in the outer edge of the disk that each alternate projection is opposite to one of the slots in the bearing so as to best clamp the rings together in relation to the slots and thus provide a ring of great strength, relatively to the amount of metal used.

In forming or pressing the two rings to form the hollow cage, as described, I provide an outwardly extending circumferential wall 15 joining the inner flange 8 with the body portion of the ring and a similar wall 16 at the outer edge joining the outer flange 9 with the body of the ring. These concentric walls have two very important functions; they make the ring very stiff and rigid, especially when the two are locked together in the hollow box form so that the ring as a whole is prevented from being easily warped out of true flat condition and by means of these walls I provide end thrust bearing surfaces 17 of appreciable extent to take the radial end thrust of the rollers 2. I am enabled by this means to provide ample end bearing surfaces for the rollers and at the same time make up my cage out of exceedingly thin sheet metal.

Figure 2:
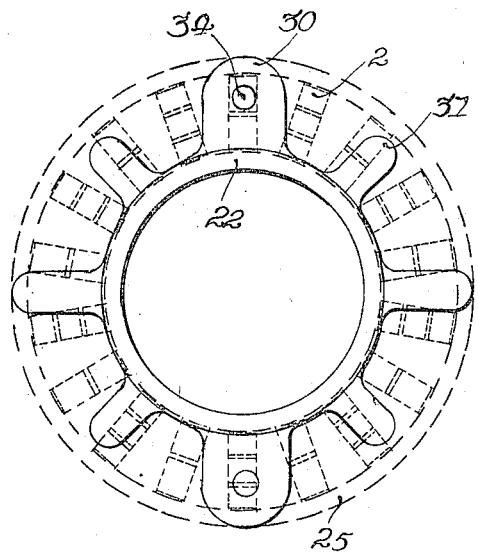
Fig. 2 is an end view of one of the backing elements shown in Fig. 1, the coöperating thrust bearing shown in dotted lines.

The ribbed backing sleeve 22, which I have shown in Figs. 1 and 2, illustrates one form of non-continuous, or lightweight backing for the race rings, but it is obvious that many other forms of noncontinuous race ring backings might be employed to fulfil various imposed conditions of construction and use. In Figs. 11 and 12 I have shown a collar for backing up the race ring 27, which comprises an inner ring member 37, and an outer ring member 38, joined by a plurality of radial arms or partitions 39. The backing is adapted to be secured to the shaft 21 by any suitable means such as the tapered pin 40.

The non-continuous backings, which it is necessary to use in various mechanisms, which I provide with my anti-friction thrust bearing, impose detrimental features of operation which I minimize by my invention. The limited space between the backing surfaces, as described, prevents the use of race rings which are rigid enough in themselves to withstand flexing when the members backing up these rings are noncontinuous, either of the form shown in Figs. 1 and 3, or the form shown in Figs. 11 and 12, consequently these race rings are liable to give way more or less, or flex slightly under heavy thrusts. Considered radially, the backings for the race rings 27 and 28, permit the rings to give way more at one point than at another. In other words, the nature of the support for the race rings varies radially. In the form shown in Fig. 11, the race ring 27 forms what may be termed a weak bridge between the inner and outer ring bearing surfaces 37 and 38 and the ring 27 tends to be distorted between the inner and outer supports. In the form shown in Figs. 1 and 2, the ring 28, having a continuous support at its inner edge, is firmly backed up at this part, but the outer part of the support being composed of the ribs 30 and 31, and being non-continuous circumferentially the outer edge of the ring 28 tends to give way under pressure, between the backing ribs. In both forms of backing, as in other forms of noncontinuous backings, for such thin race rings, it will now be clear that the rings are liable to give way and not remain true and flat. I meet this difficulty by dividing the rollers 2 into a plurality of shorter rollers; preferably I provide two rollers 18 in every other slot 5, and substantially of equal length and in the other slots I preferably provide three short rollers 19; in each case the rollers in the slots are of a combined length to substantially fill the slots, but of such a length that they fit loosely and freely between the outer and inner flanges of the cage. These rollers, which are thus divided, avoid the binding and friction which would be developed, when the race rings flex or give way under stress and which would be present if the rollers were continuous from the inner to the outer part of the bearings. While I might, so far as this feature is concerned, provide the same number of short rollers in all of the slots, I prefer to provide the different numbers of rollers in alternate slots to pevent the wearing of ridges on the race rings. The rollers of different lengths will track over or contact with the parts of the race rings between the rollers in the adjacent slots and thus wear the race rings evenly.

It will be understood that in the mechanisms in which I employ my thrust bearings, space cannot be provided for cone shaped races and rollers, but I minimize the effect of parallel rollers by the dividing of the rollers into the plurality of shorter rollers, as this permits the several short rollers to roll around on their different lengths of tracks and reduces the sliding and friction between the rollers and the race rings, to a practical minimum. I preferably round the ends of the rollers 18 and 19, so as to reduce the contacting surfaces to a minimum.

As shown in Figs. 11 and 12 I arrange the inner bearing ring 37 opposed to the end of the sleeve 22 and I so proportion the thrust collar 25 that the inner ends of the antifriction rollers are interposed between these ring bearings and the outer ends of the rollers overlie the outer backing ring 38. The inner ends of the rollers are thus arranged to withstand the thrust between the backing members without tending to distort the race rings 27 and 28, and the thrust is taken in one direction, at least, at the outer edge of the bearing directly by the backing ring 38. I thus minimize the distortion or flexing of the race rings as much as possible, while preserving the light weight or skeleton construction illustrated. Furthermore the divided rollers are particularly valuable in this form of bearing as the outer and inner ends of the rollers, which carry the thrust, rotate freely of each other, and thus reduce the internal friction of the bearing to a minimum.

It is obvious that I could so arrange the projections 6 and 7 that I could make both plates 3 and 4 with a single set of dies, and in Fig. 10 I have shown such a form of bearing. In this form the outer projections 6, instead of being opposite to the slots in the ring, as shown in the other figures of the drawings, are arranged so that they extend circumferentially from the center line of one of the slots to a point midway between adjacent slots, and the inner projections are arranged in the same manner, consequently I can form two plates from a single set of dies and when they are relatively reversed and placed together, they can be interlocked as shown in said figure.

In mounting my improved thrust bearing 25 between the backing members, I provide these members with dowel pins 34 in the flat opposed surfaces of these members and I preferably provide blind sockets or holes 35 in the backs of the rings 27 and 28 to receive these dowels to retain the rings in place and prevent their rotation. I provide the collar 20 with a central cylindrical projection 36 surrounding the shaft 21 and fitting within the cage and whereby, as described, said cage is held centered in proper relation to the rings 27 and 28 and the two elements 20 and 22.

As it is obvious that my invention could be embodied in many other forms, I do not limit my invention to the specific structures herein shown and described.

I claim:

1. In combination, two relatively rotatable elements, one at least thereof comprising a thin walled sleeve, an anti-friction thrust bearing interposed between said elements, comprising a relatively thin flat cage, anti-friction rollers carried by the cage, a relatively thin flat race ring between the bearing and said sleeve, the sleeve being positioned against the inner edge of said ring, and outwardly projecting ribs on the sleeve for extending the ring backing surface at the end of the said sleeve.

2. In combination, two relatively rotatable elements, one at least comprising a thin walled sleeve, a roller thrust bearing interposed between said elements, a relatively thin race ring between the bearing and the end of the sleeve, the bearing and race ring extending radially beyond the sleeve, spaced radial ribs on the sleeve for extending the backing for said race ring, spaced rollers in the thrust bearing, the spacing of the rollers relatively to the ribs being such as to cause at least one pair of oppositely disposed rollers to lie over oppositely disposed ribs at all relative positions of bearing and sleeve.

3. In combination, two relatively rotatable elements, one at least thereof comprising a thin walled sleeve, an anti-friction thrust bearing interposed between said elements, and comprising a relatively thin flat cage, anti-friction rollers carried by the cage, a relatively thin flat race ring between the bearing and said sleeve, spaced outwardly extending ribs on said sleeve for extending the ring-backing surface, spaced rollers in said bearing, the number of rollers being such that the positions of the rollers break joints with the ribs at all relative positions of bearing and sleeve.

4. In combination, two relatively rotatable elements, one at least being a relatively thin walled sleeve, a thin roller thrust bearing interposed between the elements, relatively thin flat race rings between the bearing and said elements, radially extending ribs on the sleeve for extending the end surface thereof to properly back up the adjacent race ring, said bearing comprising a cage containing anti-friction rollers, and a concentric projection on one of said elements extending within said cage and adapted to retain the same centered relatively to said elements.

5. A sheet metal cage for anti-friction rollers comprising two flat ring-like members, flat flanges on said rings clamped firmly together, the body portion of said ring between the inner and outer flanges being formed outwardly and joined to said flanges by circumferential walls, said body portion provided with radial slots extending from the inner to the outer circumferential walls, said walls forming bearing surfaces at the ends of the slots.

6. In a bearing of the kind described, a flat ring-like cage provided with a plurality of radial slots for anti-friction rollers, a plurality of rollers in each slot, the rollers in some slots breaking joints with the rollers in other slots.

7. In a bearing of the kind described, a flat ring-like cage provided with a plurality of radial slots for anti-friction rollers, two rollers in every other slot and three rollers in the alternate slots, the intermediate ends of the rollers in adjacent slots lying in different circles.

8. In a cage for rollers formed of two sheet metal rings joined at their inner and outer edges, the body portions of the two rings being separated to provide an inner space between them, registering radial slots in the two rings for anti-friction rollers, the margins of the slots forming roller overlapping flanges projecting beyond the planes of the rings to engage and hold the rollers in the cage.

9. In a thrust bearing, a cage formed of two flat sheet metal rings, alternate projections on the edges of the rings formed over the edges of the opposite ring for clamping the rings together, registering slots in the rings for receiving anti-friction rollers and axially extending interlocking projections on the inner edge of the rings for forming an axial flange for engagement with concentric bearing parts.

10. The improvements herein described, comprising a pair of thin disk-like race rings, race ring backing members having noncontinuous backing surfaces, a series of radially extending anti-friction rollers, interposed between the race rings, each said roller being divided radially of the bearing into a plurality of relatively short rollers, and a cage for retaining the rollers in position.

11. The improvements herein described, comprising a pair of relatively thin disk-like race rings, a race ring backing member behind one of the race rings, the backing surface of said member being noncontinuous radially, a cage arranged between the race rings, the cage having radial slots extending substantially from its inner to its outer edge, and a plurality of rollers in each slot.

12. The improvements herein described, comprising a pair of thin disk-like race rings, a race ring backing member behind one of the race rings, said backing member comprising an inner and outer ring joined by a plurality of webs, radially extending bridging anti-friction elements between the race rings extending from the inner to the outer backing ring, said elements each comprising a plurality of short rollers.

13. The improvements herein described, comprising a pair of relatively thin flat race rings, radially extending anti-friction elements interposed between the race rings, a backing for one race ring comprising inner and outer sleeve-like members arranged at the inner and outer edges of the race ring, the ends of said rollers overlying the backing sleeves, each said element comprising two or more short cylindrical rollers arranged end to end.

14. The combination of a pair of race rings, a pair of opposed members relatively axially movable, and serving to reinforce said race rings, one of said members having radial extensions in spaced relation, and an anti-friction unit between said race rings, the individual elements of which are in multiples, said anti-friction element being arranged to bridge the portions of said race rings which are over said extensions.

In witness whereof, I hereunto subscribe my name this 30th day of January, A. D. 1919.

CHARLES A. WINN.